US008050530B2

(12) United States Patent
Martinez et al.

(10) Patent No.: US 8,050,530 B2
(45) Date of Patent: *Nov. 1, 2011

(54) METHOD FOR PRODUCING ELEMENTS COMPRISING FIBER OPTICS, DEVICE FOR IMPLEMENTING SAID METHOD, OPTICAL FIBERS ELEMENT AND OPTICAL ARRANGEMENT COMPRISING SUCH AN ELEMENT

(75) Inventors: Christophe Martinez, Grenoble (FR); Karen Gilbert, Le Chevalon de Voreppe (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 12/950,491

(22) Filed: Nov. 19, 2010

(65) Prior Publication Data

US 2011/0062606 A1 Mar. 17, 2011

Related U.S. Application Data

(63) Continuation of application No. 11/910,121, filed as application No. PCT/FR2006/050299 on Apr. 5, 2006, now Pat. No. 7,916,993.

(30) Foreign Application Priority Data

Apr. 6, 2005 (FR) ...................................... 0503426

(51) Int. Cl.
*G02B 6/00* (2006.01)
(52) U.S. Cl. .............................. 385/137; 385/51; 385/52
(58) Field of Classification Search ........................ None
See application file for complete search history.

(56) References Cited

U.S. PATENT DOCUMENTS

| | | | | |
|---|---|---|---|---|
| 5,708,741 A | * | 1/1998 | DeVeau | ........................ 385/49 |
| 6,795,634 B2 | | 9/2004 | Jeong et al. | |
| 2002/0094178 A1 | * | 7/2002 | Matsumoto et al. | .......... 385/115 |

FOREIGN PATENT DOCUMENTS

| | | | |
|---|---|---|---|
| EP | 1 219 992 A1 | | 7/2002 |
| EP | 1223445 A1 | * | 7/2002 |
| JP | 2000298226 A | | 10/2000 |
| JP | 2003156648 A | | 5/2003 |

\* cited by examiner

*Primary Examiner* — Michelle R Connelly Cushwa
(74) *Attorney, Agent, or Firm* — Oblon, Spivak, McClelland, Maier & Neustadt, L.L.P.

(57) ABSTRACT

A method for producing an optical fiber element provided with several optical fibers disposed in a matrix, including: a) placing and maintaining the several optical fibers in grooves formed in a mould plate, said grooves being in different planes, b) injecting a hardenable material adhering to the several optical fibers, c) solidifying the hardenable material to maintain the several optical fibers in a position set by the grooves, and d) removing at least the mould plate.

12 Claims, 10 Drawing Sheets

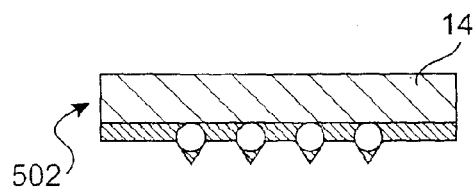
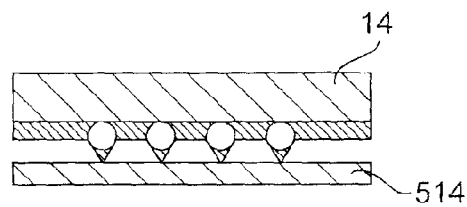
FIG.9a　　　　　　　　FIG.9b
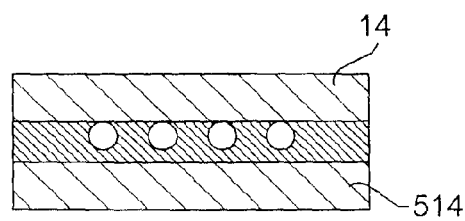
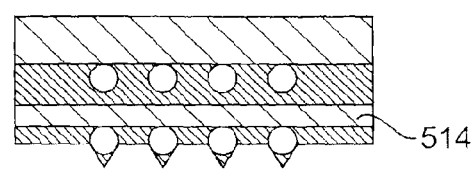
FIG.9c　　　　　　　　FIG.9d
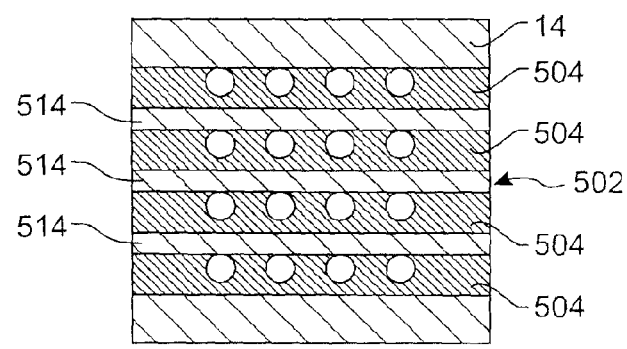
FIG.9e

METHOD FOR PRODUCING ELEMENTS COMPRISING FIBER OPTICS, DEVICE FOR IMPLEMENTING SAID METHOD, OPTICAL FIBERS ELEMENT AND OPTICAL ARRANGEMENT COMPRISING SUCH AN ELEMENT

CROSS REFERENCE TO RELATED APPLICATION

The present continuation application claims the benefit of priority under 35 U.S.C. 120 to application Ser. No. 11/910,121, filed Sep. 28, 2007, now U.S. Pat. No. 7,916,993 B2, which is a 371 of PCT/FR2006/050299, filed Apr. 5, 2006, and claims the benefit of priority under 35 U.S.C. 119 from French Application No. 0503426, filed on Apr. 6, 2005. Application Ser. No. 11/910,121 is hereby incorporated herein by reference in its entirety.

FIELD OF THE INVENTION AND PRIOR ART

The present invention relates to a method for producing elements comprising fiber optics in defined positions, to a device for the implementation of said method, to the optical fibers elements obtained through said method and to the optical arrangements, in particular optoelectronics, comprising such elements.

Fiber optics are used in a number of optoelectronic devices such as optical telecommunications devices, datacoms and optical sensors. Fiber optics make it possible to guide optical beams between the various nodes and components used in these devices. Among these components, one may cite optical sources, detectors, spectrum analyzers, amplifiers, attenuators and switches. However, the connection between the ends of the fiber optics and the inlet or outlet of the component raises a number of problems, which slows large-scale usage of such devices.

Currently, in order to obtain fiber optic assemblies, in which the optical fibers are arranged in a precise manner in English terminology are used, provided with longitudinal V-shaped grooves, precisely adjusted, in which the fiber optics are positioned. This technique is described in U.S. document 6,795,634 B2. A counter-blade is then disposed on the optical fibers opposite the V-groove arrays. A resin or glue is then introduced between the plate and the V-groove array. A unitary sandwich structure is then obtained. The structure is parallelepiped in shape, from which the optical fibers come out, and can be easily manipulated and positioned.

The V-groove arrays are made primarily by chemical etching using lithography methods or by saw cut etching.

Although the production cost for groove array having a simple shape remains commercially acceptable, it remains high relative to other technologies and prevents devices using optical fibers from truly interesting financially. Moreover, when the devices require specific distributions of optical fibers, the production cost of V-groove arrays becomes prohibitive.

Moreover, in the event the optical fibers element comprises optical fibers distributed over several layers (matrix assembly of fibers), there is currently no simple production method.

It is consequently one object of the present invention to offer a simple method for producing optical fibers elements.

It is also one object of the present invention to offer a method for producing optical fibers elements having a complex structure.

It is also one object of the present invention to offer a method for producing optical fibers elements at a competitive production price.

DESCRIPTION OF THE INVENTION

The objects stated above are reached through a method in which the V-groove array is used as a reusable mould and not as a base integrated into the final element. In this way, even if the mould has a complex shape and a high production cost, its repeated use makes it possible to cushion its cost and thereby to produce elements at a low production cost.

In other words, the V-groove array no longer serves as a base, but rather solely as a mould, the optical fibers are maintained by a hardenable material and potentially by bases having simple shapes.

The fact of using a single mould improves the repeatability of the method for producing the structure of the optical fibers element.

Moreover, this method enables the production of optical fibers elements having complex networks of optical fibers.

The present invention therefore relates to a method for producing an element provided with several optical fibers disposed in defined positions, comprising the following steps:
  placing and maintaining optical fibers in grooves formed in a plate,
  injecting a hardenable material adhering to the fibers,
  solidification of the hardenable material to freeze the fibers in the position set by the grooves,
  removing at least the grooved plate forming the mould.
  The hardenable material is, for example, a resin.

Advantageously, maintaining the fibers is also ensured by a support plate, disposed on the optical fibers opposite the plate forming the mould. The hardenable material can then be injected between the grooved plate and the support plate.

Advantageously, the method according to the invention makes it possible to form a optical fibers element having a matrix structure be repeating the steps listed above.

Furthermore, the method according to the present invention also comprises a step for solidification of the hardenable material, for example, by luminous insolation or heating of the hardenable material.

Advantageously, luminous insolation of the resin is done in ultraviolet and the plate forming the mould and/or the support plate is made of a material transparent to ultraviolet rays.

In one example, the method according to the present invention may also comprise a step for gluing a support plate instead and in place of the mould plate.

In another example, the method according to the invention comprises a step for gluing the element directly on a transfer structure of an optical device. In this case, the transfer structure may comprise grooves corresponding to the grooves of the mould plate. This enables interpenetration between the optical fibers element and the structure, and ensures defined positioning between the optical fibers element and the structure. The interface between the transfer structure and the optical fibers element may also be flat.

In another example, the transfer structure or the support plate comprises a trench sized such that, at the beginning of the gluing step, the optical fibers element only rests on the transfer structure or on the support plate by its lateral ends.

Advantageously, the optical fibers are cleaved before their positioning in the mould plate.

The production method according to the invention may also comprise a step for polishing the ends of the optical fibers; advantageously, this step for polishing the ends of the optical fibers takes place before removal of the plate forming the mould.

The present invention also relates to a device for implementation of the method according to the invention, characterized in that it comprises at least one mould plate provided with first longitudinal grooves on a first surface, and in that said first surface has low adhesion properties with regard to the hardenable material intended to be injected between the mould plate and the support plate.

In one embodiment, the mould plate also comprises two longitudinal grooves which depth is greater than that of the first longitudinal grooves.

For example, the first surface receives a $C_4F_8$ or OMCTS or SiOC type treatment obtained by plasma deposition process.

According to one embodiment, the grooves have different depths so as to define distinct parallel planes for the optical fibers.

According to another embodiment, the grooves are located in the bottom of a trench, said trench forming, on the surface of a first optical fibers element, positioning means relative to a second mould plate.

Advantageously, the second mould plate comprises a flat-bottomed trench, so as to obtain, after moulding on the first optical fibers element of a flat surface, a second optical fibers element provided with a flat surface.

Furthermore, the device comprises a third mould plate provided with a trench having a grooved bottom so as to receive optical fibers, the depth of the trench being such that when the second element is placed in the trench, the flat surface of the second element bears on the optical fibers.

Advantageously, the mould plate(s) comprise(s) trenches for supplying the grooves with resin.

Preferably, the trenches have a trapezoidal cross-section.

The mould plates may be formed in a silicon substrate chemically etched by photolithography etching process or using a saw.

For example, the grooves have a V-shaped cross-section, the branches of the V forming a 70.6° angle, and the grooves are spaced from each other at a distance of 250 µm, corresponding to an optical fiber size.

The present invention also relates to a optical fibers element obtained using a method according to the invention.

Advantageously, the support blade is in glass, and particularly in pyrex®.

In one advantageous example, the optical fibers element comprises a support blade provided with a trench under of and in a straight line of the optical fibers.

In one particular example, the support blade comprises a surface formed by at least two offset parallel planes and intended to bear on the optical fibers disposed in the corresponding offset parallel planes.

The present invention also relates to a fiber optic device comprising an element according to the invention.

BRIEF DESCRIPTION OF THE DRAWINGS

The present invention will be better understood with the help of the description below and the annexed figures, for which the top and bottom correspond to the upper and lower parts of the drawing, respectively, and in which:

FIGS. 9*a* to 9*e* are steps in another example of a production method according to the present invention for an element comprising optical fibers assembled in a matrix.

DETAILED DESCRIPTION OF SPECIFIC EMBODIMENTS

Figure 1A:
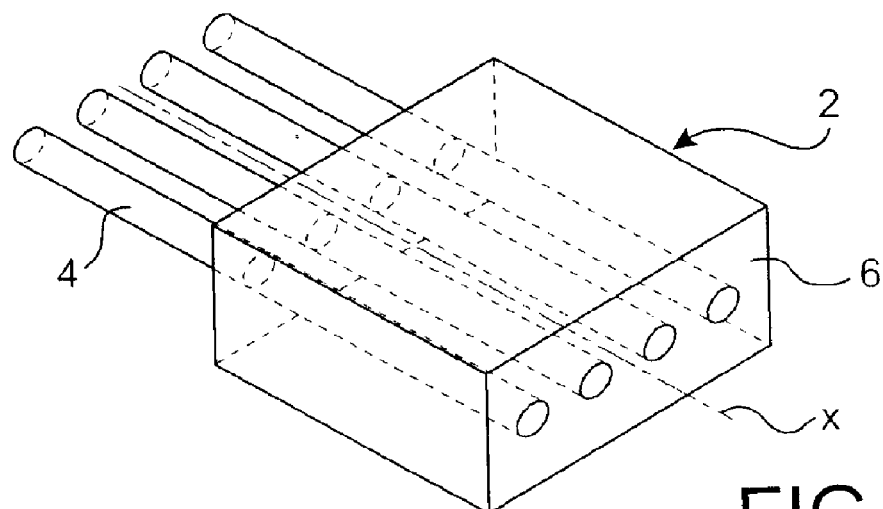
FIG. 1*a* is a perspective view of a optical fibers element obtained using a method according to the present invention.
Figure 1B:
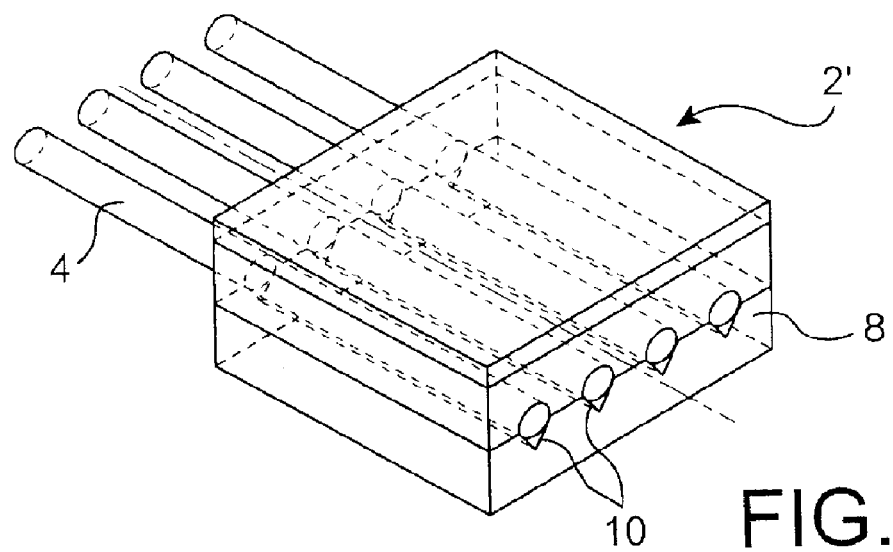
FIG. 1*b* is a perspective view of a optical fibers element of the prior art.

In FIG. 1*a*, one can see an example of a optical fibers element 2 according to the present invention, comprising optical fibers 4 aligned following a longitudinal direction X and maintained in a defined position by a holder 6 in resin. This assembly 2, according to the present invention, does not comprise, contrary to the optical fibers elements 2' of the state of the art, whereof one element is illustrated in FIG. 1*b*, a support plate 8 provided with V-shaped grooves 10, in which the optical fibers are positioned before being submerged in a resin, the support plate then being a permanent part of the optical fibers element.

In FIGS. 2*a* to 2*f*, we can see the different steps of an example of a method according to the present invention, comprising the following steps:

placing several optical fibers 4 in the grooves 112 of a grooved or mould plate 100, depositing a support plate 14 on the optical fibers opposite the mould plate 100, injecting a hardenable material between the mould plate 100 and the support plate 14, processing the hardenable material so as to harden it, removing the mould plate 100.

We will now describe the method according to the present invention in detail.

Figure 2A:
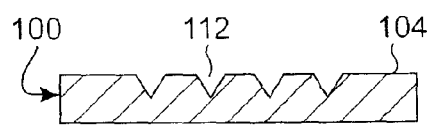
FIGS. 2*a* to 2*f* are steps in an example of a method according to the present invention.

The mould plate 100, having a substantially rectangular shape, comprises longitudinal grooves 112 made in an upper surface 104 of the plate 100. In the illustrated example, the grooves have a V-shaped cross-section (FIG. 2*a*).

The optical fibers 4 have the shape of a long regular cylinder, relative to their diameter.

Figure 2B:
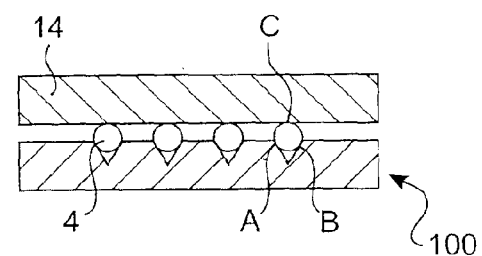
Figure 2C:
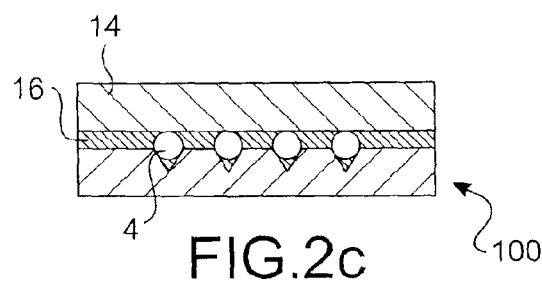

The optical fibers 4 are disposed in the grooves 112 such that, on a cross-section, the optical fiber rests in the groove 112 in two points A and B. The support plate 14, formed for example from a flat blade, called a counter-blade, is deposited on the optical fibers opposite the mould plate 100 and is in contact with each of the fibers at a point C when considering a cross section (FIG. 2*b*). The positioning of each fiber is thereby generally ensured to within about 1 μm. The support plate 14 has a shape adapted to maintaining fibers in the grooves 112 during the steps for injection and hardening of the resin, regardless of the shape of the mould plate and the distribution of the fibers. Other maintaining means allowing later removal of the mould plate may also be used.

Figure 6:
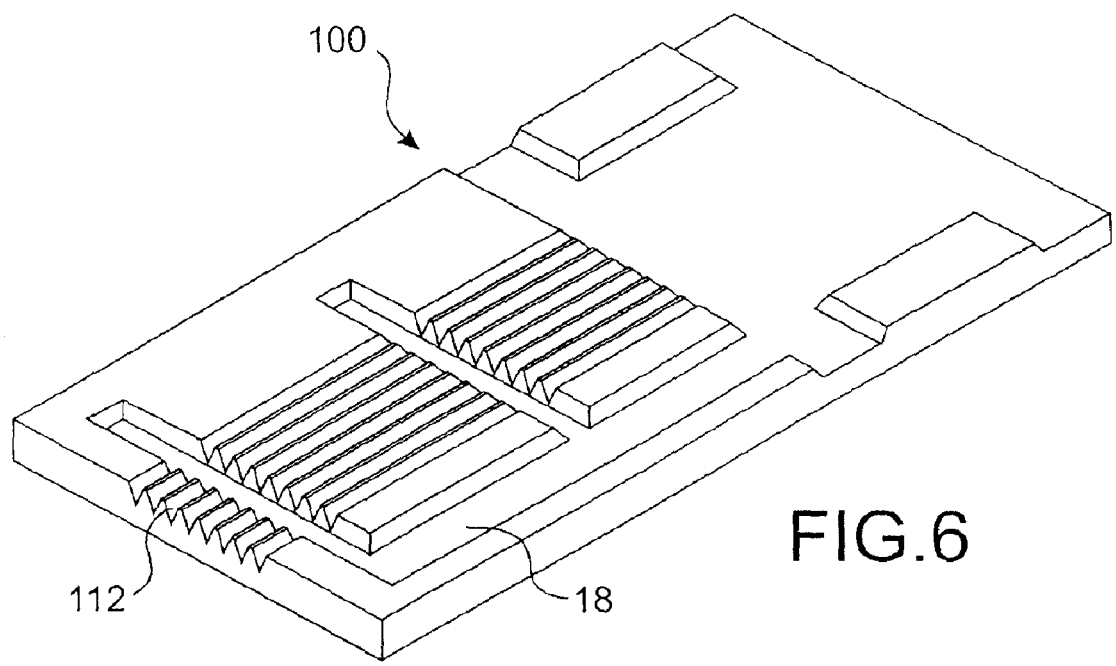
FIG. 6 is a perspective view of a mould plate for implementation of the method according to the present invention.

In another step, a resin 16, for example of the liquid polymer type, or more generally a hardenable material, liquid having a greater or lesser viscosity, adhering to the optical fibers, for example a suitable sol-gel, is then injected between the mould 100 and the support plate 14. This resin penetrates all of the space defined between the mould 100 and the support plate 14, in particular between the mould 100 and the optical fibers. Advantageously, trenches 18 for supplying resin, etched in the mould 100 (FIG. 6), allowing the resin to circulate toward the grooves may also be made. The resin can also be deposited prior to positioning of the support plate.

The resin 16 is then solidified, for example by cross-linking. Depending on the type of resin used, cross-linking is obtained by luminous insolation, for example in ultraviolet (UV) and/or by heating, or using any other method known by one skilled in the art depending on the type of hardenable material used. In the case of luminous insolation, it is preferable to use transparent materials in the concerned spectral band, to produce the mould 100 and/or the support plate 14. Advantageously, the support plate 14 is made of glass, in particular pyrex®, which is effectively transparent to UV rays.

As an example, one type of polymer resin that may be used is an epoxy resin under the trade name EPO-TEK OG198-50® marketed by the Company EPOTEK.

Figure 2D:
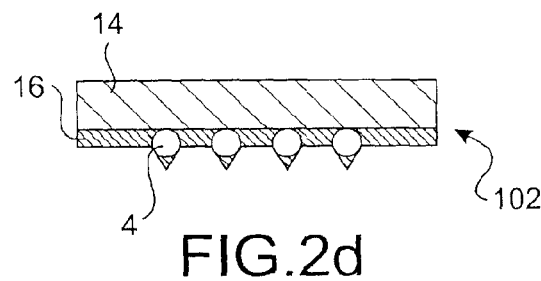
Figure 2E:
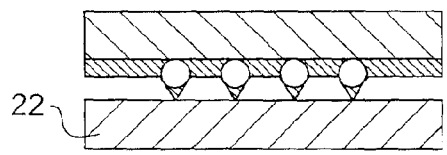
Figure 2F:
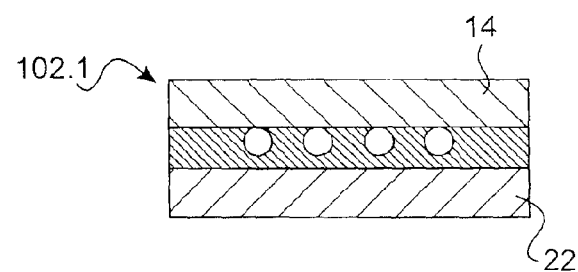

When the resin 16 is solidified, the element 102 formed by the optical fibers 4 trapped in the solid resin 16 and the counter-blade 14, is extracted from the mould 100 (FIG. 2*d*). To perform this extraction, a mould 100 is anticipated whereof the surface 104 intended to be in contact with the resin 16 preferably has low adhesion or anti-adhesion properties relative to the resin, so as to enable easier extraction of the optical fibers element. For this purpose one may anticipate, for example, applying a treatment to the mould plate 100 such that it does not adhere to the resin. This may, for example, be a $C_4F_8$-type treatment (perfluorocyclobutane) obtained by plasma deposition process or am OMCTS (Octamethylcyclotetrasiloxane) or SiOC treatment, also obtained by plasma deposition process known by those skilled in the art.

Preferably, this type of treatment guarantees, in addition to the non-adherence of the resin cross-linked on the first support 100, sufficient mouldability to allow the non-cross-linked resin to completely fill the space defined by the plates 100, 14.

All of the mould plates used as moulds in the different examples of a method according to the present invention can be treated in the manner described above or in a similar manner, such that they have this anti-adhesion property, or at least low adhesion relative to the resin.

In the example described above, the support plate 14 is an integral part of the optical fibers element, which makes it possible to stiffen it. For this, it is preferable for the resin to adhere well to this support plate 14. However, it is understood that one may also remove this support plate 14. To this end, prior treatment, as previously described, may be done on the support plate 14.

In order to increase the stiffness of the element 102, one may also dispose, on the lower surface 106 of the element 102, previously in contact with the mould plate 100, a second support plate 22. In order to make this second plate 22 integral with the assembly 102, one again injects a resin between the second support plate 22 and the element 102; this resin can be the resin 16 previously used or another resin compatible with the resin 16, and more generally another material of greater or lesser viscosity, able to solidify (for example a sol-gel) and compatible with the first material used to maintain the optical fibers.

A solidification treatment is then done in the same way as previously. One then obtains a optical fibers element 108 comprising flat upper and lower surfaces, very easy to manipulate.

Figure 3A:
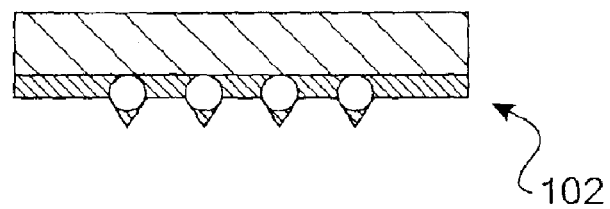
FIGS. 3*a* to 3*c* are steps of another example of a method according to the present invention.
Figure 3B:
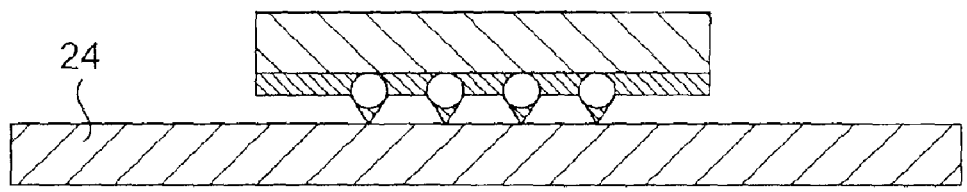
Figure 3C:
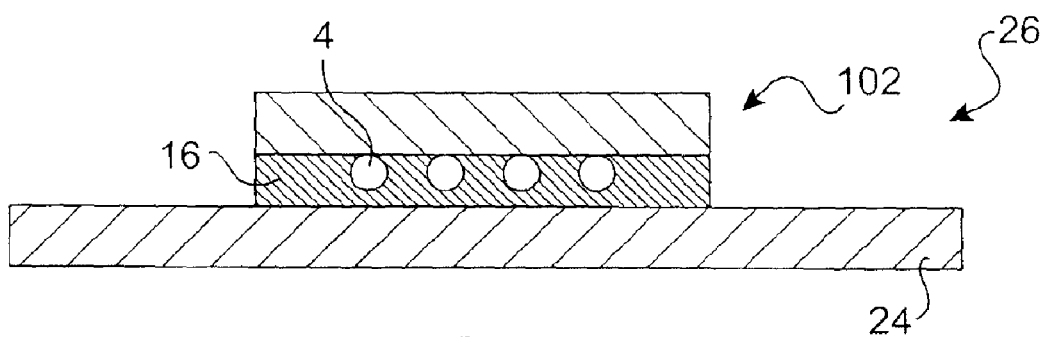

It is understood that the addition of the second support plate 22 to the element 102 can be avoided, particularly in the case where, for example, the element 102 is intended to be made integral on a structure 24 of a device 26, which itself ensures the stiffness of the element 102 (FIGS. 3*a* to 3*c*). Making the element 102 integral with the structure 24 is done, for example and as previously described, by inserting resin and solidifying it.

If the fibers have been cleaved prior to being buried in the resin 16, meaning if their ends have been cut so that the optical beams coming out of the fibers are not deformed by passing through the refracting surface, and if the precision of the alignment of the fibers at the end of the assembly is sufficient for the desired application, the optical fibers element can be used directly in a device or marketed.

However, if the fibers are not cleaved or if the alignment of the ends of the fibers is not sufficient, one may polish using the normal techniques for polishing optical fibers, not described here.

If one wishes to perform polishing, the element 102.1 comprising first and second support plates is advantageous because it is easier to handle.

It should be noted that some of the resins that may be used to produce the elements according to the present invention have the characteristic of undergoing a removal during their cross-linking. It is then preferable to take this removal into account during the creation of the V-grooves.

The first support plate is, for example, made of a silicon substrate, on the upper surface of which the V-grooves and the circulation channels are etched, for example by photolithography. During sizing of the mould plate, the diameter of the stripped fiber is taken into account, for example 125 μm, as well as the desired pitch between the fibers, which is typically, for the aforementioned diameter of the stripped optical fibers, approximately 250 μm (value preferably corresponding to the diameter of the non-stripped fiber). The dimension of the V-grooves depends on the production technology selected. In particular, with chemical etching of the silicon, the sides of the grooves form a 54.7° angle relative to the surface of the substrate, and the size of the opening of the grooves is therefore calculated accordingly.

In FIGS. 4*a* to 4*f*, one can see an example of a method for producing a optical fibers element 202, wherein the optical fibers 4.1 and 4.2 are disposed parallel to each other, and are contained in a plane P1 and in a plane P2 respectively, the planes P1 and P2 being parallel and separate. In this case, it appears that producing such an element using traditional techniques has a very high production cost. The present invention is then very interesting.

The mould plate 200 comprises grooves 203 having a V-shaped cross-section, but contrary to the preceding examples, the grooves 212.1, 212.2 have different depths. In the example of the optical fibers element containing two plates P1, P2 for two optical fibers 4.1, 4.2, the mould plate 200 comprises a first pair of grooves 212.1 having a first depth h1, and a second pair 212.2 of grooves having a second depth h2, h1 being greater than h2. Thus, during extraction, the fibers 4.1 are disposed in the plane P1, located below the plate P2 containing the fibers 4.2

Figure 4A:
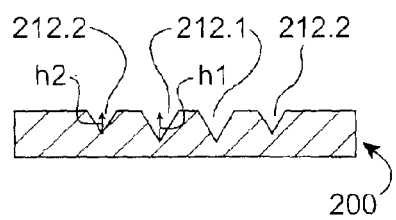
FIGS. 4*a* to 4*f* are steps of another example of a method according to the present invention for producing an element comprising optical fibers disposed in distinct planes.
Figure 4B:
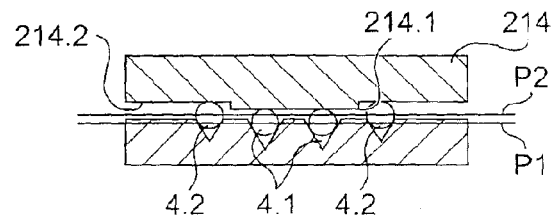
Figure 4C:
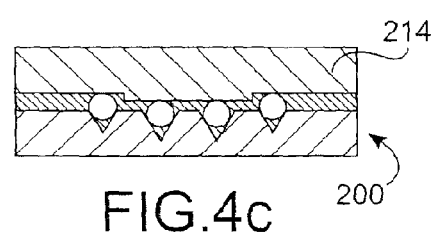
Figure 4D:
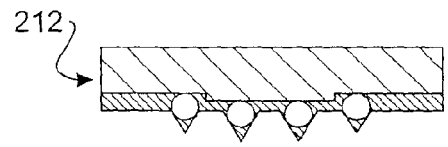
Figure 4E:
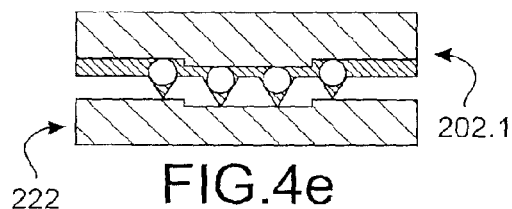
Figure 4F:
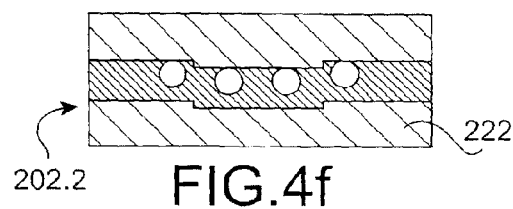

In FIG. 4b, one can see a second support plate 214 comprising a surface intended to come into contact with the optical fibers, defined by two planes 214.1, 214.2 offset so as to follow the optical fibers 4.1, 4.2 contained in the planes P1, P2, respectively. Likewise, in FIG. 4f, in the case where a second support plate 222 is used, said second support plate also has an adapted profile. One obtains (FIG. 4e) an element 202.1 provided with only one support plate and an element 202.2 (FIG. 4f) provided with two support plates on either side of the layer of resin.

The following steps illustrated in FIGS. 4c to 4f are similar to those described for the preceding examples.

In FIGS. 5a to 5g, one can see an embodiment of an element 302 with optical fibers distribution in a matrix or in parallel layers. This type of element is, according to the known techniques, very problematic to produce, since the support plates in which the V-shaped grooves are made are only easy to etch on one of their surfaces.

The method according to the present invention makes it possible to produce this type of element with matrix distribution by using only mould plates provided with grooves on just one surface.

Figure 5A:
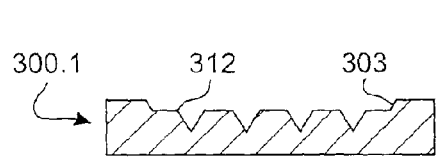
FIGS. 5*a* to 5*h* are steps of still another example of a method according to the present invention for producing an element comprising optical fibers assembled in a matrix.
Figure 5B:
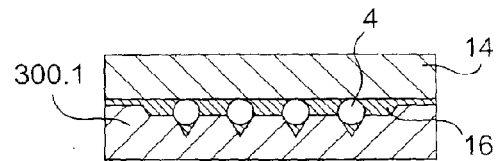
Figure 5C:
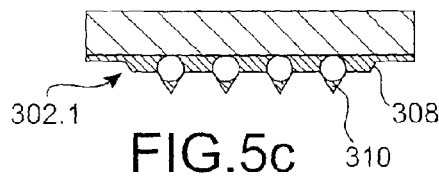

In FIGS. 5a and 5b, one can see a first mould plate 300.1, provided with a trench 303 in the bottom of which V-shaped grooves 312 are made. Optical fibers 4 are disposed in the grooves according to a first layer C1. A support plate 14 is then disposed on the optical fibers. The resin 16 is then injected between the mould plate 300.1 and the support plate 14. The mould plate 300.1 is then removed. The intermediate optical fibers element 302.1 thereby obtained comprises, on one surface 306 opposite the support plate 14, a step-profile 308 provided with V-shaped protuberances 310 (FIG. 5c).

Figure 5D:
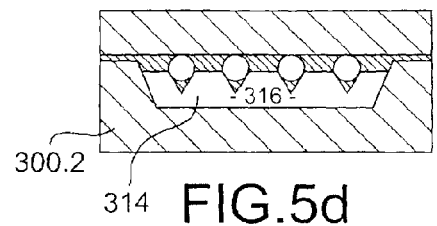

In FIG. 5d, one can see the intermediate element 302.1 disposed on a second mould plate 300.2, the step 308 forming means for aligning the intermediate optical fibers element relative to a trench 314 formed in the second mould plate 300.2. The trench 314 is provided with a flat bottom having a depth greater than the height of the V-shaped protuberances 310.

Figure 5E:
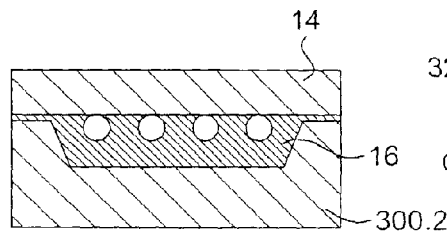

The intermediate element 302.1 and the second plate 300.2 then define a cavity 316, wherein the resin is injected in the step illustrated in FIG. 5e. This resin is then solidified as previously described. A second intermediate element 302.2 is then obtained after extraction, comprising a flat surface 317 opposite the support plate 14 (FIG. 5f).

Figure 5F:
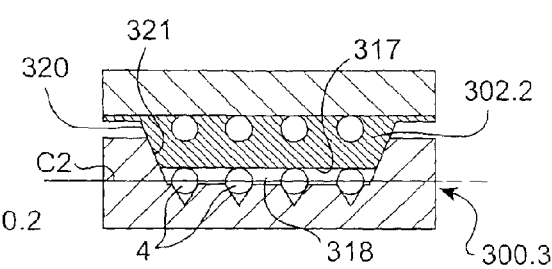
Figure 5G:
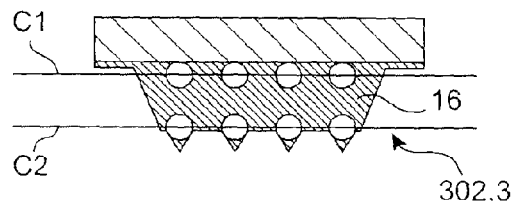

In FIG. 5f, one can see a step for producing a second layer C2 of optical fibers in a plane parallel to the first layer C2. To do this, the intermediate element 302.2 is disposed in a third mould plate 300.3 or mould. The mould 300.3 comprises a trench 318, in the bottom of which V-grooves are formed and wherein optical fibers are disposed. The flat surface 317 of the second element 302.2 bears on the optical fibers, and the fibers are again kept in contact by three points. Advantageously, the second intermediate element 300.2 comprises alignment means 220 cooperating with the alignment means 321 of the mould 300.3, allowing precise and automatic positioning of the second element relative to the mould. In the illustrated example, the means 321 are formed by a second beveled surface cooperating with surfaces having the same slope supported by the mould 300.3 and forming the means 322.

The resin 16 is then injected between the third mould 300.3 and the second intermediate element 302.2, then this resin is solidified. A optical fibers element 302.3 comprising a distribution of optical fibers according to the parallel layers C1 and C2 is obtained after extraction.

Figure 5H:
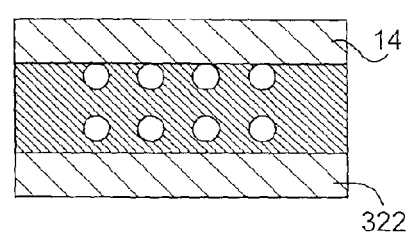

An additional step for association with another flat support plate 322 to stiffen the assembly may be carried out as already described (FIG. 5h).

In the illustrated example, the trenches advantageously have a trapezoidal cross-section forming means for guiding the optical fibers elements in the mould plates during the different stages of the method.

It is understood that one can make more than two layers, for which one need only repeat steps 5d to 5f.

Modifying the orientation of the fibers from one layer to another so as to have, for example, an orthogonal orientation of the fibers of one layer relative to the fibers of the next layer, is not beyond the scope of the present invention.

Figure 7A:
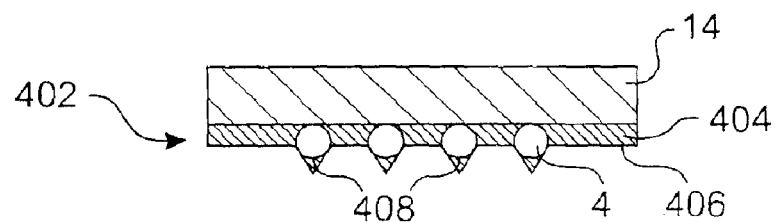
FIGS. 7*a* and 7*b* are steps in the production of a device provided with a optical fibers element according to the present invention.
Figure 7B:
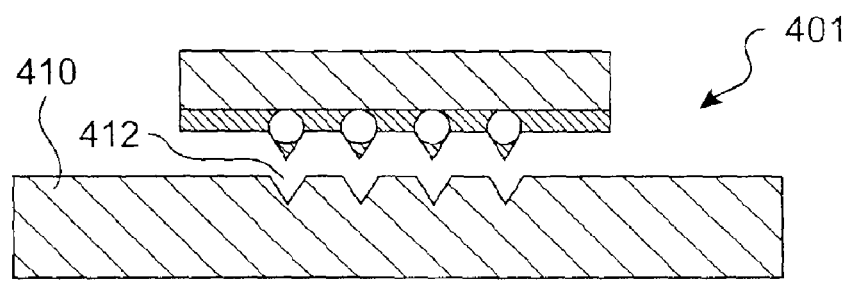
Figure 7C:
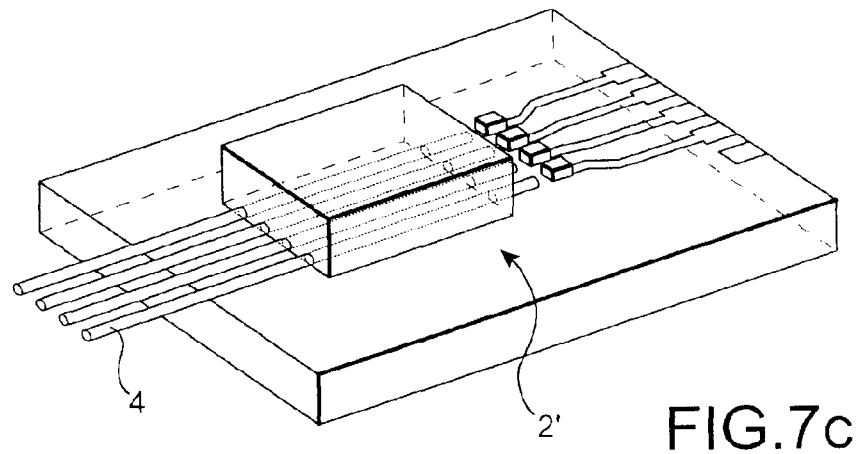
FIG. 7*c* is a perspective view of an optical device from the state of the art.

In FIG. 7c, one can see a fiber optic device from the state of the art provided with a substrate forming a non-removable support plate forming a unit with the fiber optic unit 2'. Collective polishing of the ends of the fibers is then not possible. In this case, it is therefore anticipated to cleave the fibers and put them at a distance from the component stick that one wishes to combine. Cleaving, however, causes a slight angle which means that the ends of the fibers are not all strictly parallel, which can create dispersion on the coupling ratio.

The present invention proposes a simple solution enabling precise positioning of the optical fibers relative to the collecting strip.

On FIGS. 7a and 7b, one can see an embodiment of a fiber optic device 401, wherein a optical fibers element obtained according to a method according to the invention is assembled. The element 402 is similar to that obtained during the steps shown in FIGS. 2a to 2d. The element 402 comprises a resin part 404 in which the optical fibers are immersed provided on a surface of a counter-blade 14 and on an opposite surface 406 of V-shaped protuberances 408. The device 401 comprises a substrate 410 in which V-grooves 412 are made corresponding to the outside profile of the protuberances 408 and identical to the grooves of the production mould 100. The grooves 412 form means for precise positioning of the element 402 relative to the substrate 410.

In a following step (FIG. 7b), the element is glued on the structured substrate 410. This embodiment then guarantees optimal alignment of the fibers in relation to the substrate 410 while also enabling collective polishing of fibers before transfer of the element on the substrate.

Polishing the fiber assembly is preferably done before removal of the mould plate 100 so as to avoid ungluing of the fibers from the counter-blade 14 or pollution of the V-groove arrays 408 by polishing residue, which would disrupt the positioning of the optical fibers element on the substrate.

Figure 8A:
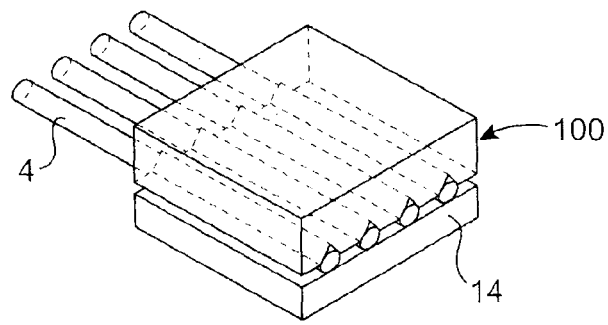
FIGS. 8*a* to 8*c* are steps in the formation of a optical fibers element according to the present invention.
Figure 8B:
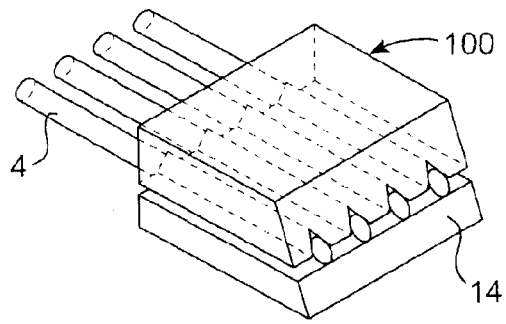
Figure 8C:
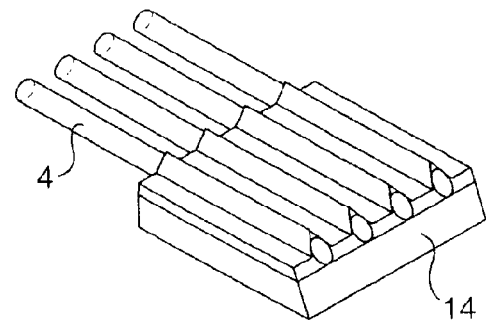

In FIGS. 8a to 8c, an additional advantage of the production method according to the present invention is explained. This makes it possible, very advantageously, to polish the fibers simultaneously according to a plane forming a non-right angle with the longitudinal direction of the fibers 4, without risking changing the orientation of the fibers in relation to each other. On the contrary, in the optical fibers elements of the state of the art, individual polishing must be done for each fiber, then the fibers must be disposed in relation to each other while ensuring the alignment of the ends of the optical fibers.

Since polishing can be done on limited areas of the mould plate 100, the mould plate 100 can be reused later. Moreover, it is also possible to polish the counter-blade 14 prior to assembly, such that only the optical fibers 4 are polished at this stage.

In FIGS. 9a to 9e, one can see the production of a optical fibers element 502 having a sandwiched matrix structure made up of a pile of base structures 102. In other words, the element 502 comprises alternating layers of optical fibers 504 maintained through the resin and a counter-blade. The stages of production correspond to a repetition of a sequence of steps illustrated in FIGS. 2a to 2f, and which therefore will not be described in detail.

In the illustrated example, two types of counter-blades are used, a first type 14 as already described and defining the upper and lower ends of the element, and a second type of counter-blade 514, thinner and intended to be disposed between two layers of resin. But it is understood that using only one type of counter-blade is not beyond the scope of the present invention.

This embodiment offers the advantage of stiffening the optical fibers element 502. Moreover, this makes it possible to obtain regular spacing between the layers of fibers simply.

In FIGS. 10a to 10f, one can see the different stages in another particularly advantageous example of a method according to the present invention.

The steps illustrated in FIGS. 10a to 10d are identical to those of the method from FIGS. 2a to 2f.

Figure 10A:
FIGS. 10*a* to 10*f* are steps in another example of a production method according to the present invention for a optical fibers element.
Figure 10B:
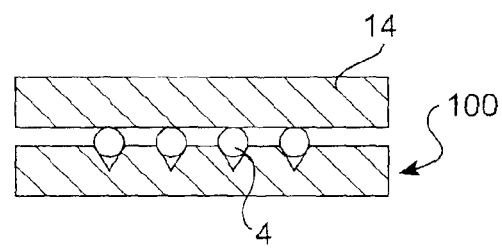
Figure 10C:
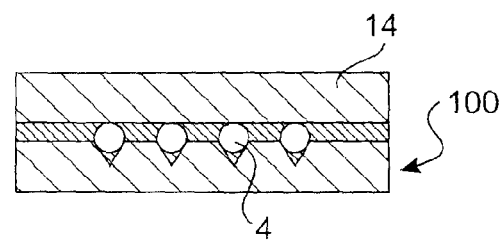
Figure 10D:
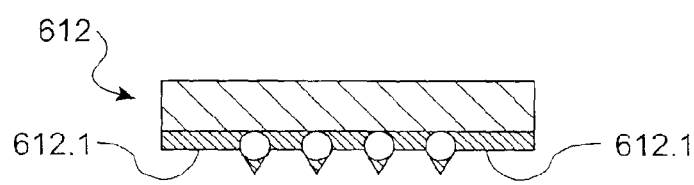
Figure 10E:
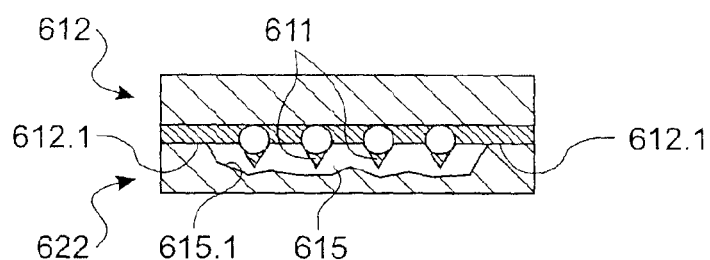
Figure 10F:
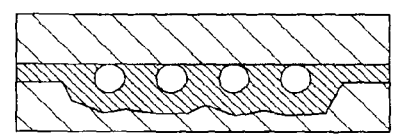
Figure 11A:
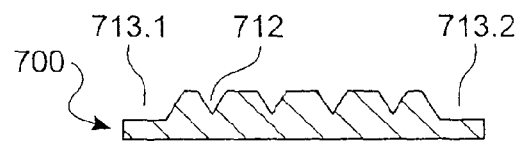
FIGS. 11*a* to 11*f* are steps in another example of a production method according to the present invention for a optical fibers element.
Figure 11B:
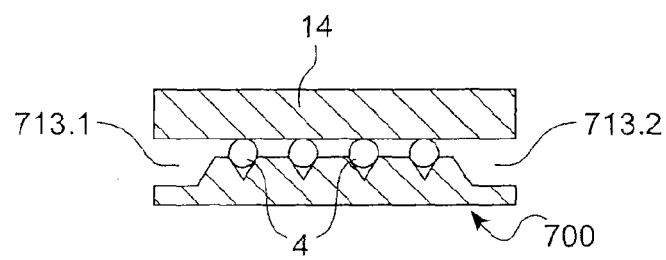
Figure 11C:
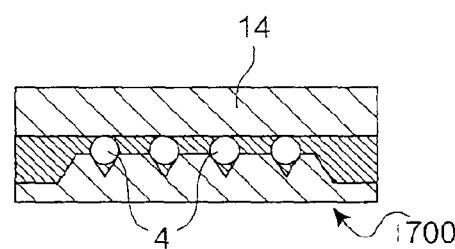
Figure 11D:
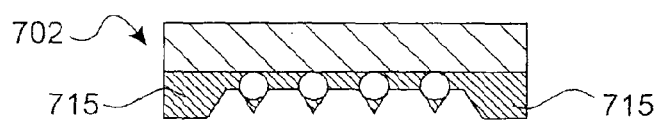
Figure 11E:
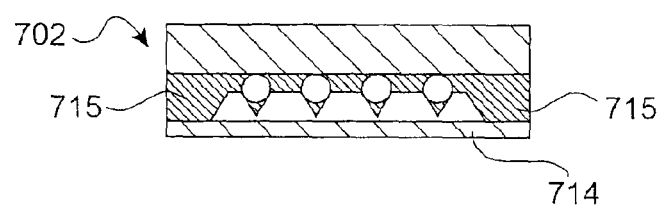
Figure 11F:
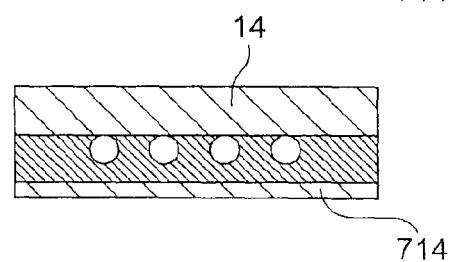

At step 10e, the element illustrated in FIG. 10d is made integral with a support plate 622, while ensuring very good alignment of the plates.

Indeed, in the method illustrated in FIGS. 2a to 2f, the parallelism of the plates 14 and 22, and therefore of the planes of the fibers relative to the support plate and/or to a transfer structure, is obtained through contact of the ends of the of the protruding ribs of the element 102, these ends having point-shape, these points being contained in a plane parallel to the plate 14. These V-shaped ribs are very fragile mechanically. One of the ends having point-shape may break; it cannot be longer guaranteed that the planes of the optical fibers and that of the support plate 22 are parallel.

This problem is particularly sensitive in the case where one wishes to directly interface the optical fibers element, also called fiber V-block, with optical components opposite it, wherein fiber positioning precision lower than 3 µm, or even lower than 1 µm, may be required.

One then uses a support plate 622 provided with a trench 615, having a depth sufficient to avoid contact between a bottom 615.1 of the trench and the points 611, the element 612 only resting on the support plate 622 by its flat lateral ends 612.1, ensuring that the plate 14 and the plate 622 are parallel.

The trench may be formed very crudely and does not require any particular precautions, since the shape of the walls does not play a role in the precision of the parallel disposal. Thus, in the illustrated example, the trench 615 has a very irregular shape, and its production may be done quickly, maintaining a low production cost.

The support plate 622 can be replaced by a transfer structure of an optical device.

This method also offers the advantage of reducing the quantity of resin used; since the volume to be filled with resin is that of the trench 615, and not that of the space defined between the support plate 22 and the element 102 of FIG. 2, which extends the width of the plates 22, 102.

In FIGS. 11a to 11f, one can also see another very advantageous production method, making it possible to ensure that a support plate 714 and an element 702 are parallel.

In this case, a mould plate 700 comprising V-grooves 712 and a first and second lateral groove 713.1, 713.2 parallel to the V-grooves 712, the grooves 713.1, 713.2 having a depth greater than that of the grooves 712 can be used. Moreover, these 713.1, 713.2 comprise a flat bottom so as to allow moulding of non-fragile, flat bottomed ribs.

In the illustrated example, the grooves 713.1, 713.2 are disposed on either side of the V-grooves, but one can dispose them between the V-grooves 712, if the distribution of the optical fibers allows. Moreover, one can provide for more than two grooves.

The production steps are similar to those of steps 2c to 2f. However, during the step illustrated in FIG. 11e, the element 702 rests on the support plate 714 on ribs 715 parallel to the V-ribs obtained from the grooves 713.1, 713.2 of the mould plate 700, and not on the ends of the V-ribs.

This method may be used to produce elements with optical fibers distributed in a sandwich matrix such as in FIG. 9e, by applying the steps from FIGS. 9a to 9e, with a mould plate 700 similar to that described below.

Thus, great precision in positioning relative to the layers of optical fibers may be obtained thanks to this embodiment.

The combination of examples of method according to the present invention or only some of these steps is not beyond the scope of the present invention.

Moreover, the present invention is not limited to a parallel arrangement of fibers, but also extends to a divergent or convergent arrangement of one or several fibers relative to the others.

Furthermore, the use of mould plates provided with grooves have a U-shaped cross-section, for example, or any other shape ensuring the desired positioning of the optical fiber, is not beyond the scope of the present invention.

The invention claimed is:

1. A method for producing an optical fiber element provided with several optical fibers disposed in a matrix, comprising:
   a) placing and maintaining the several optical fibers in grooves formed in a one piece integrally formed mould plate, said optical fibers in the one piece integrally formed mould plate being in different planes parallel to each other and to a plane defined by a surface of the one piece integrally formed mould plate in which the grooves extend in a longitudinal direction,
   b) injecting a hardenable material adhering to the several optical fibers,
   c) solidifying the hardenable material to maintain the several optical fibers in a position set by the grooves, and
   d) removing at least the one piece integrally formed mould plate to produce the optical fiber element with the several optical fibers disposed in the matrix.

2. The production method according to claim 1, comprising:
   placing a support plate on the optical fibers on an opposite side of the mould plate before the injecting of the hardenable material.

3. The production method according to claim 2, wherein a surface of the support plate that comes in contact with the several optical fibers is defined by at least two offset planes.

4. The production method according to claim 1, comprising at least one of:
   gluing a support plate to a face of the optical fiber element which was previously in contact with the mould plate, and
   gluing the optical fiber element directly on a transfer structure of an optical device.

5. The production method according to claim 4, wherein an interface between the transfer structure and the optical fiber element is flat.

6. The production method according to claim 1, further comprising:
polishing ends of the several optical fibers.

7. The production method according to claim 1, wherein said grooves have different depths in the one piece integrally formed mould plate, and said depths are measured with respect to the plane defined by the surface of the one piece integrally formed mould plate in which the grooves extend in the longitudinal direction.

8. The production method according to claim 7, wherein said grooves include a first set of grooves at a first depth and a second set of grooves at a second depth, different from the first depth.

9. A device for making an optical fiber element with several optical fibers disposed in a matrix, comprising:
a support plate; and
a one piece integrally formed mould plate provided with first longitudinal grooves on a first surface, wherein
said first surface possesses low adhesion properties regarding a hardenable material intended to be injected between the one piece integrally formed mould plate and the support plate, and each groove has a greatest depth, the greatest depth of one or several grooves being different from the greatest depth of the other grooves with respect to the first surface of the mould plate, so as to define separate parallel planes for the optical fibers, said parallel planes being parallel to a plane defined by the first surface of the one piece integrally formed mould plate.

10. The device according to claim 9, wherein said longitudinal grooves have different depths in the mould plate, said depths are measured with respect to the first surface of the mould plate.

11. The device according to claim 10, wherein said longitudinal grooves include a first set of grooves at a first depth and a second set of grooves at a second depth, different from the first depth.

12. The device according to claim 9, wherein a surface of the support plate that comes in contact with the several optical fibers is defined by at least two offset planes.

* * * * *